Sept. 27, 1960 D. BROWN 2,954,280
SOLVENT RECOVERY APPARATUS
Filed July 1, 1955
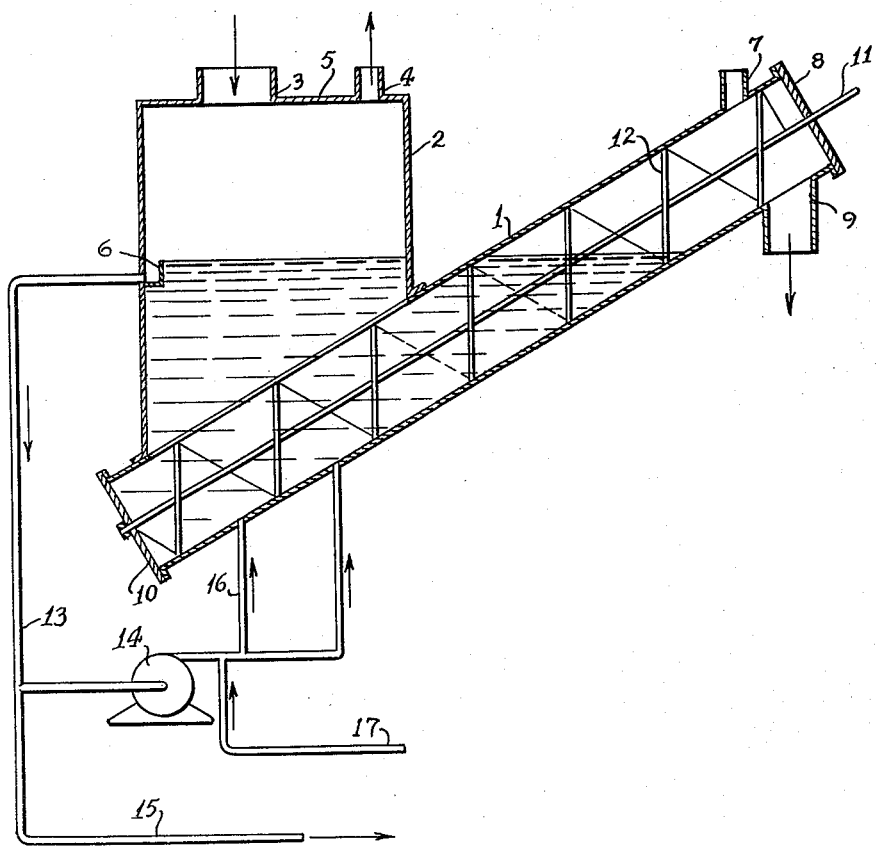
INVENTOR.
David Brown
BY
Frank Makara
ATTORNEY

2,954,280

SOLVENT RECOVERY APPARATUS

David Brown, New York, N.Y., assignor, by mesne assignments, to Scientific Design Company, Inc., a corporation of Delaware Filed July 1, 1955, Ser. No. 519,605

3 Claims. (Cl. 23—270)

This invention relates to removal of residual carbon disulfide from sulfur ores extracted therewith.

It is an objective of this invention to provide an economical and efficient process for removal of small amounts of carbon disulfide from sulfur ores.

It is another objective to provide a method of removing small amounts of carbon disulfide from sulfur ores using a minimum amount of water.

These and other objectives of this invention will become apparent upon reading the following disclosure taken in conjunction with the drawing.

Turning to the drawing, an obliquely disposed preferably cylindrical tank 1 is provided with a vertical communicating tailings tank 2 in its top surface adjacent the bottom thereof. The tailings tank 2 is provided with an ore tailings inlet opening 3 and a vapor outlet 4 in its top horizontally disposed tank wall 5. A weir 6 is secured to the inner surface of the tank 2 wall in suitable spaced relationship to top tank wall 5.

The weir 6 functions as an overflow device thereby effecting a selected liquid level in tank 2.

The obliquely disposed tank 1 is provided with a make-up water inlet opening 7 disposed in the top wall of tank 1 in suitable spaced relationship to the end plate 8. A tailings opening 9 is disposed in the tank 1 in the bottom surface adjacent the header 8.

The tank 1 is provided with a bottom plate 10 adapted to receive the end of axle 11 to which screw conveyor blades 12 are attached.

The hot effluent water from weir 6 flows through conduit 13 in part to a pump, preferably a centrifugal pump 14 and in part to waste through conduit 15.

The pumped water from pump 14 is introduced into the obliquely disposed tank adjacent the bottom head plate 10 in the bottom side thereof through conduit 16. To effect the suitable temperature for tailings treatment, steam is introduced into conduit 16 through steam conduit 17 to bring the water to about 60° C., a suitable temperature for driving out the small amounts of carbon disulfide found in the tailings. The make-up water introduced into tank 1 at opening 7 is preferably at room temperature or about 20° C. whereas the tailings dropped out through outlet opening 9 have a temperature of about 45° C.

In a typical operation of this invention hot tailings consisting of 6,000 kilograms per hour (kg./hour) and having 3,000 kg./hour of water and 1040 kg./hour of carbon disulfide are introduced into tailings opening 3 into the hot preferably 60° C. water of tank 2.

The vapor issuing from outlet 4 consists of 1040 kg./hour carbon disulfide and 50 kg./hour water. The make-up water was 2,000 kg./hr. at 20° C. The effluent from weir 6 was muddy so that 2,300 kg./hour was drawn off to waste at conduit 15, said waste being made up in large part by the make-up water at opening 7.

The pump 14 returned 12,000 kg./hour of water to the conduit 16 and this was heated to about 60° C. by use of 350 kg./hour of steam introduced into the conduit 16. Thus the hot extracting water was introduced near the bottom of the screw conveyor 12 where the tailings are treated therewith before being propelled out of the hot treating water.

The tailings after leaving the surface of the water in obliquely disposed tank 1 are washed with the make-up water thereby removing the last traces of carbon disulfide to produce substantially odor free tailings. The washed tailings are pushed or propelled upward by the screw blades 12 to outlet opening 9 where the tailings issue at the rate of 6,000 kg./hour having 3,000 kg./hour of water.

The tailings temperature is but 45° C. so that loss of hot 60° C. water is avoided in this process. Also had the make-up water been added directly to tank 2, then the steam requirement would have been 450 kg./hour.

This invention has been described illustratively but it it is not to be limited to the illustrations.

I claim:

1. An apparatus for extracting volatile tailings from discrete ore bodies comprising a tubular obliquely disposed tank having a water inlet opening in its top wall adjacent its top end and having an ore outlet opening in its bottom wall adjacent the top end, a tank vertically disposed upon and communicating with the top wall of the oblique tank adjacent the bottom end thereof, weir means disposed in said vertical tank to maintain a fixed height of liquid therein, ore inlet means and vapor outlet means disposed above said weir means, conveyor means disposed in said obliquely disposed tank to move ore tailings toward said outlet opening, pump means secured to said weir means for recycling water from said vertical tank to said obliquely disposed tank at a point adjacent the bottom end of said obliquely disposed tank, and conduit means for flowing water from said weir to waste.

2. The apparatus of claim 1 wherein said vertical tank is provided with an enclosing top wall having a tailings inlet opening and a vapor outlet opening.

3. The apparatus of claim 2 wherein the wash make-up water opening is disposed in spaced relationship to and above the weir means disposed in said vertical tank whereby said wash water washes the solid particles conveyed out of the water of said tank.

References Cited in the file of this patent

UNITED STATES PATENTS

| | | |
|---|---|---|
| 1,963,921 | Nagelvoort | June 19, 1934 |
| 2,088,190 | Du Pont | July 27, 1937 |
| 2,841,536 | Egbert | July 1, 1958 |

FOREIGN PATENTS

| | | |
|---|---|---|
| 18,512 of 1904 | Great Britain | Aug. 24, 1905 |